United States Patent [19]

Bauerkemper

[11] 4,061,522

[45] Dec. 6, 1977

[54] METHOD AND APPARATUS FOR TERMINATING A FIBER OPTIC BUNDLE

[75] Inventor: Michael I. Bauerkemper, Cerritos, Calif.

[73] Assignee: International Telephone and Telegraph Corporation, New York, N.Y.

[21] Appl. No.: 765,073

[22] Filed: Feb. 3, 1977

[51] Int. Cl.² ............................................. C09F 5/00
[52] U.S. Cl. ................................. 156/305; 156/294; 156/579; 264/1; 264/263; 425/127
[58] Field of Search ............... 156/294, 305, 578, 579, 156/500; 264/1, 263; 425/110, 127

[56] References Cited

U.S. PATENT DOCUMENTS

| 3,671,622 | 6/1972 | Humphries | 264/263 |
| 3,691,001 | 9/1972 | Takahashi et al. | 156/294 |
| 3,730,959 | 5/1973 | Horres | 264/263 |
| 3,849,219 | 11/1974 | Hall-Jackson | 156/294 |
| 3,930,103 | 12/1975 | Chimura et al. | 264/1 |

Primary Examiner—Edward G. Whitby
Attorney, Agent, or Firm—Thomas L. Peterson

[57] ABSTRACT

A method and apparatus for terminating a fiber optic bundle in which the bundle is inserted without an adhesive into the rear of a contact. An adhesive is then injected into the fiber bundle from the front of the contact and allowed to dry. The apparatus comprises a body which supports a contact containing a fiber optic bundle and an injector which is loaded with a charge of adhesive and mounted on the body in such a manner that the adhesive is forced into the interstices between the fibers in the bundle.

12 Claims, 4 Drawing Figures

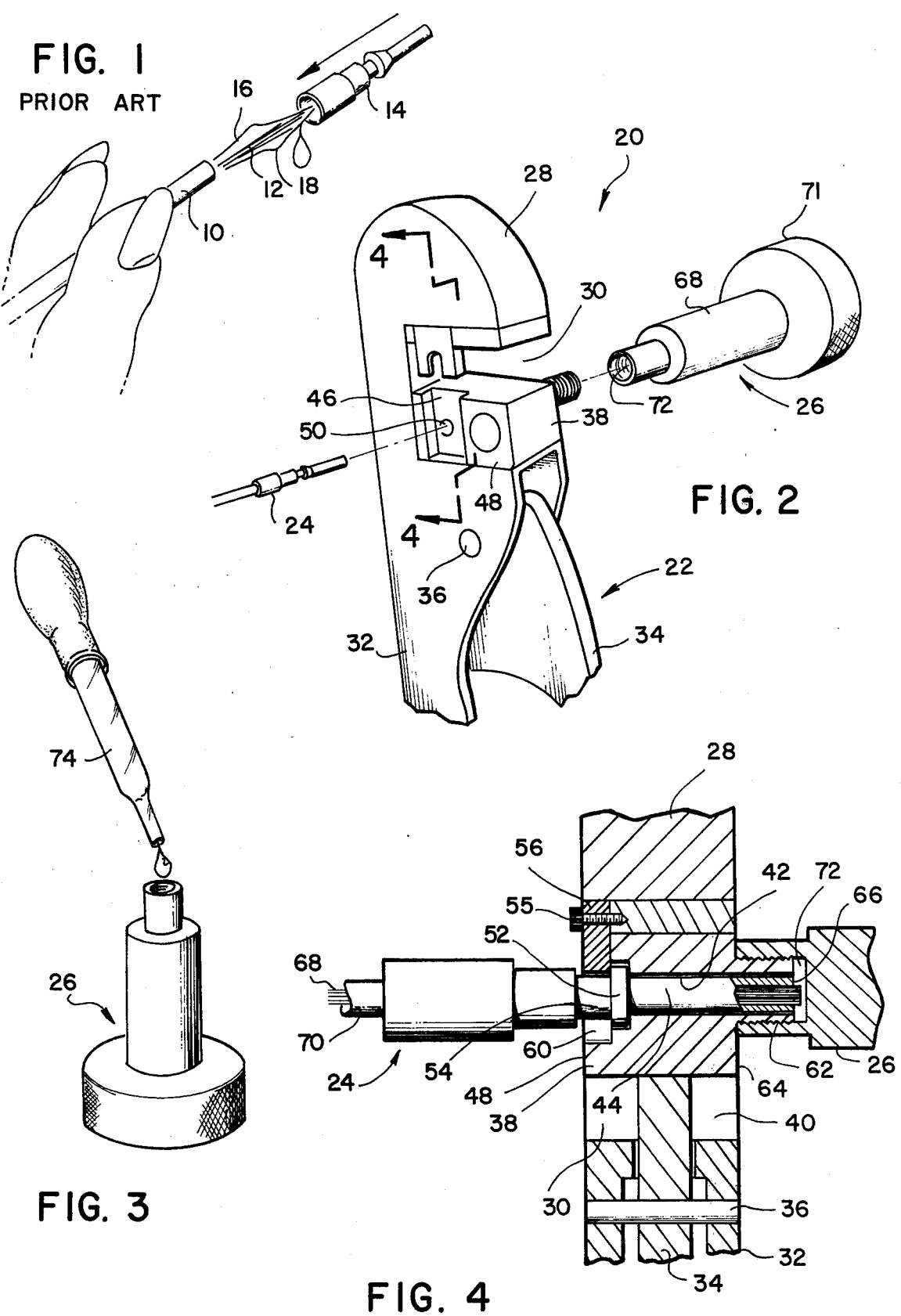

METHOD AND APPARATUS FOR TERMINATING A FIBER OPTIC BUNDLE

BACKGROUND OF THE INVENTION

The present invention relates generally to a method and apparatus for terminating a fiber optic bundle and, more particularly, to an improved method and apparatus for injecting an adhesive in a fiber optic bundle which is being terminated by a contact.

In the terminating of a fiber optic bundle, it is necessary to apply an adhesive to the fibers in the bundle so that the bundle will be retained in the contact in which it is mounted. In addition, the adhesive fills the voids in the optical fiber bundle so as to provide a rigid support for the individual fibers which is necessary so that the end of the fiber bundle may be ground and polished without chipping the edges of the fibers.

It is the present practice to wet the end of a fiber optic bundle with an adhesive and to insert the bundle into the rear of a contact. This method has two distinct disadvantages. Since the fibers are pre-wetted with an adhesive, they tend to cling to the sides of the contact, thereby making insertion of the fiber bundle into the contact difficult. Occasionally, some of the outside fibers of the bundle will break when the bundle is inserted into the contact. In addition, adhesive on the fiber bundle is forced back into the bundle jacket when the bundle is inserted into the contact. When the adhesive drys and hardens in the jacket of the fiber optic bundle, the cable looses its flexibility in that area. The loss of flexibility of the fiber bundle cable can result in considerable difficulties in mounting the cable in certain fiber optic connectors.

It is the purpose of the present invention to provide a new method and apparatus for terminating fiber optic bundles which will overcome the attendent disadvantages of the present techniques being utilized, as discussed above.

SUMMARY OF THE INVENTION

According to the principal aspect of the present invention, a fiber optic bundle is inserted into the rear of a contact without an adhesive thereon. Thereafter, an adhesive is injected into the front end of the contact and allowed to dry. Since the fiber optic bundle is inserted into the contact without an adhesive, the fibers on the bundle will not tend to cling to the sides of the contact and excess adhesive will not be forced back into the fiber optic bundle jacket, as in the method presently in use.

According to another aspect of the invention, there is provided an apparatus for injecting an adhesive into a contact containing a fiber optic bundle. The apparatus comprises a body having a bore therein which is sized to receive a contact for the fiber optic bundle. An adhesive injector is employed which has a recess therein for containing a charge of adhesive. Means is provided for mounting the injector on the body adjacent to the bore therein in such a manner as to cause the adhesive in the recess of the injector to be injected into the end of the contact. The apparatus is simple in construction, inexpensive to manufacture, and easy to utilize even by unskilled personnel.

BRIEF DESCRIPTION OF THE DRAWING

FIG. 1 depicts the prior art method for mounting a contact on the end of a fiber optic bundle with an adhesive;

FIG. 2 is a perspective view of the apparatus of the invention consisting of a hand tool and an injector, with a contact shown in position to be inserted into the tool;

FIG. 3 is a perspective view of the injector of FIG. 2 showing how it is initially loaded with a charge of an adhesive; and FIG. 4 is a partial sectional view taken along line 4—4 of FIG. 2 with the contact and adhesive injector both mounted on the tool.

DESCRIPTION OF THE PREFERRED EMBODIMENT

Referring again to the prior art method depicted in FIG. 1, a fiber optic cable 10 having a fiber bundle 12 is initially wetted with a suitable adhesive, such as an epoxy. The jacket of the cable is removed from the end of the cable. The bare end of the bundle 12 is inserted with the adhesive thereon into the rear of a contact 14. As shown in FIG. 1, when the fiber bundle wetted with an adhesive is inserted into the contact, some of the fibers, for example fibers 16 and 18, will hang up on the sides of the contact and make insertion of the bundle very difficult, and occasionally will result in fibers being broken. In addition, when the fiber bundle is pushed into the contact, the adhesive thereon will be forced back into the cable 10 resulting in loss of cable flexibility.

According to the present invention, rather than inserting the fiber optic bundle with an adhesive into the rear of the contact, the bundle is inserted without an adhesive into the contact and, thereafter, the adhesive is injected into the bundle from the front of the contact. The fiber bundle may be inserted into the contact either dry or coated with a suitable lubricant which is substantially less viscous than the adhesive, which facilitates insertion of the bundle into the contact. Preferably, the lubricant is a solvent, such as alcohol, which will evaporate after the bundle is inserted into the contact. Inserting the bundle without an adhesive into the contact in accordance with the present invention not only avoids the problem of fibers breaking during insertion and excess adhesive being forced back into the fiber optic cable, but also allows a fiber bundle to be inserted into a contact with a smaller bore than in the past which enhances compaction of the fibers in the bundle. After the bundle has been mounted in the contact and an adhesive injected into the front of the contact to fill the interstices between the fibers in the bundle, the front end of the contact may be compressed around the fiber bundle in order to enhance the consolidation of the fibers in the contact. The adhesive is allowed to cure. Thereafter, the forward mating end of the contact may be ground and polished.

Reference is made to copending application of R. L. McCartney et al. entitled "Fiber Optic Connector," Ser. No. 610,223, filed Sept. 4, 1975, which describes a preferred contact structure for a fiber optic bundle which may be utilized in the present invention. It will be understood, however, that the present invention is not limited to the specific contact disclosed in the aforementioned McCartney application, but may be applied to any fiber optic bundle contact or ferrule.

Reference is now made to FIG. 2 of the drawing which illustrates the apparatus of the present invention, generally designated 20, which consists of a tool 22 for mounting a fiber optic contact 24 and an adhesive injector 26. The tool 22 is shown in the form of a hand tool, but it also could be constructed as a part of an automated apparatus for terminating fiber optic bundles in sequence. The tool 22 may be a modified electrical contact crimping tool which consists of a frame-like structure 28 having a rectangular recess 30 opening to one side thereof. The structure 28 has a downwardly depending handle portion 32. A second handle 34 is pivotally connected to the structure 28 by means of a pivot pin 36.

A rectangular body 38 is vertically movable in the recess 30. As illustrated in FIG. 2, the body 38 normally sits on the bottom of the recess. Means, not shown, are provided on the structure 28 and the body 38 to guide vertical sliding movement of the body 38 in the recess 30. The handle 34 has an eccentric 40 formed on its upper surface which, when the handles 32 and 34 are pivoted together, lifts the body 38 from the position illustrated in FIG. 2 to that illustrated in FIG. 4. The purpose of such movement of the body 38 will be explained later.

A horizontal, cylindrical bore 42 extends through the body 38. The bore 42 is dimensioned to slidably receive the forward end 44 of the fiber optic contact 24 with a relatively close sealing fit therebetween. A vertical groove 46 is formed in the side 48 of the body 38. The bore 42 is centrally spaced between the sides of the groove 46. A counterbore 50 is formed in the body 38 adjacent to the side 48 thereof. The counterbore 50 is dimensioned to receive a radially outwardly extending annular flange 52 on the contact 24. The width of the flange 52 is approximately the same as the depth of the counterbore. An annular groove 54 is formed in the contact behind the flange 52. A contact retainer plate 56 is mounted on the structure 28 by means of a screw 58. The plate 56 is dimensioned to slide into the vertical groove 46 in the body 38. A downwardly opening notch 60 is formed in the bottom of the plate 56. The width of the notch 60 is slightly greater than the reduced diameter section 54 of the contact behind the flange 52, but is less than the diameter of the flange.

As seen in FIG. 2, the contact 24 is inserted into the bore 42 from the side 48 of body 38. Thereafter the handles 32 and 34 are squeezed, causing the handle 34 to pivot around the rod 36 so that the eccentric 40 will lift the body 38. Lifting the body 38 causes the retainer plate 56 to enter the groove 46 while the notch 60 will receive the reduced diameter section 54 of the contact. Due to the relative dimensions of the notch and the contact, it will be appreciated that the retainer plate 56 will be located behind the flange 52 so as to restrict axial movement of the contact in the bore 42.

A cylindrical hollow boss 62 is formed on the side 64 of the body 38 coaxial with the bore 42. The diameter of the opening in the boss 62 is the same as the diameter of the bore 42. The length of the boss 62 is such that when the contact 24 is mounted in the bore 42, the front mating end 66 of the contact is flush with the end of the boss, as seen in FIG. 4. Preferably, the fiber optic bundle 68 in the cable 70 which is mounted in the contact 24 extends a very short distance beyond the front end 66 of the contact. Preferably, the bundle should not protrude outside the contact more than .03 inch.

The injector 26 comprises a cylindrical body 68 having an enlarged knurled handle 71 on the rear thereof. The front of the body is formed with a cylindrical recess 72. The depth of the recess 72 is slightly greater than the length of the boss 62 on the tool 22 so that the bottom of the recess will not engage the forward end of the bundle 68 when the injector is mounted on the boss 62.

The exterior of the boss 62 is threaded, as is the interior of the recess 72, so that the injector 70 may be threadedly engaged with the boss to mount the injector on the tool 22.

To use the apparatus 20 to inject an adhesive into a contact mounted on an optical fiber bundle, the bundle with the contact 24 thereon is mounted in the tool 22 in the manner described previously herein, wherein the retainer plate 56 firmly retains the contact on the body 38. As seen in FIG. 3, a syringe 74 is utilized to load a charge of adhesive in the recess 72 in the end of the injector 26. The recess is completely filled with the adhesive so that the injector is charged with a predetermined quantity of the adhesive. The injector is then screw-threaded on the boss 62 of the tool 22. As the injector is threaded onto the boss, the volume of the recess 72 decreases, thereby causing the adhesive in the recess to be forced into the interstices between the fibers in the bundle 68 at the forward end of the contact 24. That is, the boss 62 and the forward end of the contact 24 function as a piston which forces the adhesive into the bundle as the piston moves into the recess 72. Thus, it will be appreciated that the tool 22 and injector 26 provide a simple and inexpensive apparatus for forcing a predetermined volume of adhesive into a fiber bundle. The length of the recess 72 may, of course, be changed to alter the quantity of adhesive that is forced into the end of the contact. Preferably, the recess 72 is so dimensioned that the quantity of adhesive that is forced into the contact will not be so great that adhesive will be forced back into the cable 70 behind the contact which would result in loss of cable flexibility.

While the injector illustrated in the drawing and described herein has a threaded engagement with the boss 62, it will be appreciated that the two parts may have a sliding interengagement, if so desired, which would be preferable in an automated system in which a powered device could be utilized for pushing the injector on the boss with sufficient force to inject the adhesive in the injector into the fiber optic bundle. Further, in an automated system the contact 24 could be mounted in a suitable chuck which would serve to insert and position the contact 24 in the bore 42. Other modifications and variations of the invention will be apparent to those skilled in the art.

What is claimed is:

1. A method of mounting a contact having a bore therethrough, a front mating end and a rear end on a fiber optic bundle comprising the steps of:

inserting the bundle without an adhesive into said bore from the rear of said contact until the front face of said bundle is substantially flush with said front mating end;

thereafter injecting an adhesive into said bundle through the opening of said bore at said front mating end; and allowing said adhesive to cure.

2. A method as set forth in claim 1 including the additional step of:

coating the fibers of said bundle with a lubricant substantially less viscous than said adhesive prior to inserting said bundle into said contact bore.

3. A method as set forth in claim 2 wherein:
said lubricant is a solvent.

4. A method as set forth in claim 2 wherein:
said lubricant is alcohol.

5. A method as set forth in claim 1 including the additional step of:
radially compressing said contact adjacent to said front end thereof to compact the fibers in said bundle before said adhesive cures.

6. A method as set forth in claim 5 including the additional steps of:
grinding and polishing said front face of said bundle smooth after said adhesive cures.

7. A method as set forth in claim 1 wherein:
a predetermined volume of adhesive is injected into said contact bore.

8. An apparatus for injecting an adhesive into a contact containing a fiber optic bundle comprising:
a body having a bore therein adapted to receive said contact from one end of said bore;
an adhesive injector having a recess therein for containing adhesive; and
means for mounting said injector on said body adjacent to the other end of said bore and for causing said adhesive in said recess to be injected into the end of said contact.

9. An apparatus as set forth in claim 8 wherein:
said mounting and injecting means comprises a cylindrical hollow boss on said body coaxial with said bore and dimensioned to fit into said recess with substantial sealing engagement therebetween whereby said boss functions as a piston forcing adhesive out of said recess into said contact when said injector is mounted on said boss.

10. An apparatus as set forth in claim 9 wherein:
said boss is externally threaded; and
said recess is internally threaded to threadedly engage said boss.

11. An apparatus as set forth in claim 8 including:
means on said body to restrict axial movement of a contact in said bore.

12. An apparatus as set forth in claim 9 including:
a contact retainer plate adjacent to the side of said body at said one end of said bore;
said plate and body being movable relative to each other; and
said plate having a notch therein aligned with said bore and dimensioned to receive said contact therein when said plate and body are moved toward each other.

* * * * *